United States Patent
Okino et al.

(10) Patent No.: US 6,740,869 B2
(45) Date of Patent: May 25, 2004

(54) LIGHT BEAM SCANNING DEVICE FOR MICRO-AREA LIGHT SOURCE

(75) Inventors: Yoshiharu Okino, Kanagawa (JP); Motokazu Yamada, Tokushima (JP)

(73) Assignees: Fuji Photo Film Co., Ltd., Kanagawa (JP); Nichia Corporation, Tokushima (JP)

(*) Notice: Subject to any disclaimer, the term of this patent is extended or adjusted under 35 U.S.C. 154(b) by 252 days.

(21) Appl. No.: 09/944,180

(22) Filed: Sep. 4, 2001

(65) Prior Publication Data

US 2002/0027595 A1 Mar. 7, 2002

(30) Foreign Application Priority Data

Sep. 1, 2000 (JP) .......................... 2000-266130

(51) Int. Cl.[7] .................................................. H01J 3/14
(52) U.S. Cl. ........................................ 250/236; 347/232
(58) Field of Search ................................. 250/236, 234; 358/296; 359/204; 347/232, 252, 229

(56) References Cited

U.S. PATENT DOCUMENTS 4,754,291 A * 6/1988 Horikawa .................. 347/252
5,025,321 A * 6/1991 Leksell et al. .............. 358/296
5,754,214 A * 5/1998 Okino ......................... 347/229

FOREIGN PATENT DOCUMENTS

JP     2000-332291     11/2000     ........... H01L/33/00

OTHER PUBLICATIONS

Patent Abstracts of Japan 2000–332291, Nov. 30, 2000.

* cited by examiner

Primary Examiner—Thanh X. Luu
(74) Attorney, Agent, or Firm—Sughrue Mion, PLLC

(57) ABSTRACT

Microarea light-emitting diodes, which have no variation in light output power the like due to mode-hopping, are used and changes in properties such as light output and the like due to generated heat are prevented. Pulses having a constant period and a substantially constant power are used, a number of the pulses within a period for forming an image corresponding to one pixel is determined on the basis of image data, and light beams emitted from the microarea light-emitting diodes are modulated by pulse signals including the determined pulses.

16 Claims, 6 Drawing Sheets

LIGHT BEAM SCANNING DEVICE FOR MICRO-AREA LIGHT SOURCE

CROSS REFERENCE TO RELATED APPLICATIONS

This application claims the priority of Japanese Patent Application No. 2000-266130 filed on Sep. 1, 2000.

BACKGROUND OF THE INVENTION

1. Field of the Invention

The present invention relates to a light beam scanning device, and more particularly, to a light beam scanning device with which a photosensitive material is scanned using light beams emitted from microarea light-emitting diodes.

2. Description of the Related Art

Conventionally, when a light beam scanning device is used to expose a color photosensitive material having a spectral sensitivity in a visible region (400 to 690 nm), a color image is recorded by scan-exposing the color photosensitive material with light beams of three colors, i.e., red, green, and blue, which are modulated on the basis of image data for respective colors. Generally, single-mode semiconductor lasers are used as light sources for emitting light beams.

However, oscillation wavelength of semiconductor lasers varies depending on operation temperature and injection current, and semiconductor lasers have a mode-hopping property, that is, oscillation wavelength thereof largely varies discontinuously. This mode-hopping causes variations in light output power and wavelength, whereby image quality deteriorates.

Semiconductor lasers that are currently on the market include GaN type semiconductor lasers having oscillation wavelengths around 410 nm, AlGaInP type semiconductor lasers having oscillation wavelengths of 630 to 680 nm, and AlGaAs or GaInAsP type semiconductor lasers having oscillation wavelengths of 780 to 1550 nm. Since the only semiconductor lasers that are available are those having oscillation wavelengths in these predetermined ranges, a color photosensitive material having a spectral sensitivity in the visible region cannot be scan-exposed using a light beam having a desired wavelength. Particularly, semiconductor lasers emitting green and blue light beams having oscillation wavelengths of 450 to 550 nm for exposing silver halide photosensitive materials having spectral sensitivities in a wavelength range from 450 to 550 nm have not yet been put into practical use.

A variety of microarea light-emitting diodes emitting light in various wavelength ranges are available. For example, edge emitting light emitting diodes emitting green and blue light beams are disclosed in Japanese Patent Application Laid-Open No. 2000-332291 (Nichia Corporation). Therefore, the above problem can be solved by using such microarea light-emitting diodes. However, with microarea light-emitting diodes, the amount that the wavelength varies with respect to changes in applied current is larger in comparison with ordinary semiconductor lasers. Therefore, when an applied current is changed to change image density, not only intensity but also wavelength of a light beam is changed. Thus, quality of the image formed by the light beam whose intensity as well as wavelength are changed deteriorates.

The above-described problem which concerns variations in wavelength can be solved by using a fixed electric current for driving microarea light-emitting diodes, and modulating pulse widths of the microarea light-emitting diodes according to tone information of image data so that changes in the applied current do not directly affect variations in wavelength.

However, if the pulse widths are modulated according to image data, the microarea light-emitting diodes may be continuously lit depending on tone information. If the microarea light-emitting diodes are kept lit for a long period, properties thereof, such as light output power, wavelength, and the like, change due to heat generated by the microarea light-emitting diodes.

SUMMARY OF THE INVENTION

In order to solve the above-described problem, an object of the present invention is to provide a light beam scanning device in which microarea light emission diodes which are free from variations in light output power and wavelength due to mode-hopping are used to prevent changes in properties such as light output power and the like due to heat generation caused by applied current.

In order to accomplish the above-described object, a first aspect of the present invention includes a light source provided with a microarea light-emitting diode having microarea light-emitting regions; a modulator for generating a pulse signal including at least one pulse having a period shorter than a period for forming an image corresponding to one pixel on the basis of image data, and modulating light beams emitted from the microarea light-emitting diode with the pulse signal; and a scanner for scanning a photosensitive material with the modulated light beams.

According to the first aspect of the present invention, since the microarea light-emitting diodes having a microarea light-emitting region are used, no variation in light output power and wavelength due to mode-hopping is caused. The light beams emitted from the microarea light-emitting diodes are modulated by the pulse signal including at least one pulse having a period shorter than a period for forming an image corresponding to one pixel to make periods of the pulses shorter than the period for forming an image corresponding to one pixel. Therefore, a pause is generated between the pulses of the pulse signal, so that the microarea light-emitting diodes are not continuously driven over several pixels and light emission from the microarea light-emitting diodes are stopped during the pause to prevent changes in properties due to heat generation.

In the first aspect of the present invention, since changes in properties due to heat generation can be prevented by generating the pause between adjacent pulses, the period of the pulses may be modulated within the period for forming an image corresponding to one pixel according to image data, or, as described in a second aspect of the present invention next, pulses having a constant period and a substantially constant power may be used, and a number of the pulses within the period for forming an image corresponding to one pixel may be determined on the basis of image data.

A second aspect of the present invention includes a light source provided with a microarea light-emitting diode having microarea light-emitting regions; a modulator for determining a number of pulses having a constant period and a substantially constant power within a period for forming an image corresponding to one pixel on the basis of image data, and modulating light beams emitted from the microarea light-emitting diode with a pulse signal including the pulses; and a scanner for scanning a photosensitive material with the modulated light beams.

The second aspect of the present invention uses the microarea light-emitting diodes, and the light beams emitted from the microarea light-emitting diodes are modulated with the pulse signal including the pulses having a constant period and a substantially constant power. Therefore, a pixel is scanned by at least one light beam having a constant beam spot and a substantially constant light output, and a density of a pulse-shaped current within a constant period is changed to record the pixel. Therefore, similarly to the first aspect of the present invention, a pause is generated between the pulses of the pulse signal, and the microarea light-emitting diodes are not continuously driven over several pixels. Thus, changes in properties of the microarea light-emitting diodes due to heat generation can be prevented.

The period of the pulse can be less than one tenth of the period for forming an image corresponding to one pixel. Therefore, one pixel is exposed with ten or more light beams, and a high quality image can be formed.

By forming an image corresponding to one pixel by repeating scanning with the light beam modulated by the pulse signal in a main-scanning direction several times in a sub-scanning direction, the pixel is scanned by several scan lines in the sub-scanning direction. Thus, an image corresponding to one pixel is formed by being exposed several times respectively in the main-scanning direction and in the sub-scanning direction, and an image having high quality also in the sub-scanning direction can be formed.

The number of the pulses forming an image corresponding to one pixel can be determined on the basis of tone information obtained from image data.

The light source can include a microarea light-emitting diode emitting a light beam in a wavelength range corresponding to blue, a microarea light-emitting diode emitting a light beam in a wavelength range corresponding to green, and a microarea light-emitting diode emitting a light beam in a wavelength range corresponding to red. Thus, a color photosensitive material can be scan-exposed to form a color image.

Microarea light-emitting diodes having an area of a light-emitting region from 0.1 $\mu m^2$ to 64 $\mu m^2$ can be used as the microarea light-emitting diodes described above. Light beams emitted from the microarea light-emitting diodes are incoherent light, and do not have strong directivity like a laser beam. However, an amount of light necessary for scan-exposure can be ensured. In addition, a microarea light-emitting diode can be used in a wider wavelength range than a semiconductor laser.

The light source of the present invention may include microarea light-emitting diodes, and a microarea light-emitting diode emitting a light beam of a wavelength range corresponding to blue, a wavelength-conversion solid laser or a second-harmonic generation laser emitting a light beam of a wavelength range corresponding to green, and a semiconductor laser emitting a light beam of a wavelength range corresponding to red can be used in combination. Alternatively, a microarea light-emitting diode emitting a light beam of a wavelength range corresponding to blue, a microarea light-emitting diode emitting a light beam of a wavelength range corresponding to green, and a semiconductor laser emitting a light beam of a wavelength range corresponding to red may be used in combination.

DESCRIPTION OF THE PREFERRED EMBODIMENTS

Embodiments of a light beam scanning device of the, present invention are described in detail below with reference to figures.

Figure 1:
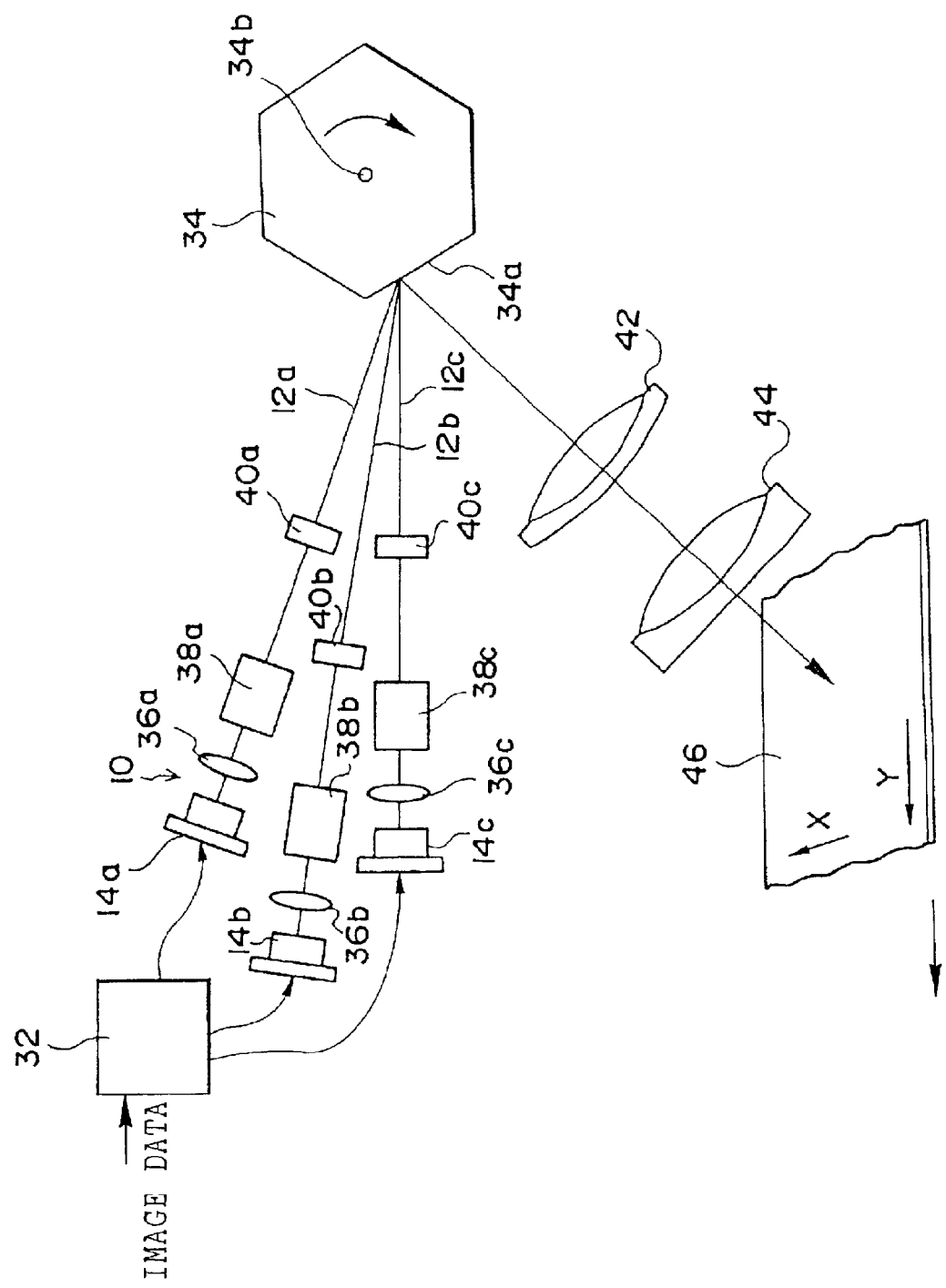
FIG. 1 is a schematic view of a light beam scanning device of an embodiment of the present invention.

As shown in FIG. 1, a light beam scanning device relating to an embodiment of the present invention includes a light source section 10 provided with edge emitting light-emitting diodes (EELED) 14a, 14b and 14c, which are microarea light-emitting diodes for emitting R (red), G (green) and B (blue) light respectively, and a polygon mirror 34 as a scanning means. Disposed between the respective EELEDs 14a, 14b and 14c of the light source section 10 and the polygon mirror 34 are collimator lenses 36a, 36b and 36c for collimating light beams, beam correction optical systems 38a, 38b and 38c for shaping beams, and cylindrical lenses 40a, 40b and 40c having lens power in a sub-scanning direction for correcting a variation of a surface angle of the polygon mirror 34. Further, an fθ lens 42 and a lens group 44 including a cylindrical lens and the like are disposed in a direction in which light is reflected from the polygon mirror 34. Two-dimensional scanning of a color photosensitive material with light transmitted through the lens group 44 is effected by the polygon mirror in a main-scanning direction (a direction of arrow x), and by conveyance of the color photosensitive material in the sub-scanning direction (a direction of arrow y).

As the microarea light-emitting diode, an EELED which has a microarea light-emitting region of about 0.1 to 64 $\mu m^2$ is preferably used. If a light emission diode whose light-emitting region exceeds 64 $\mu m^2$ (8 $\mu m$×8 $\mu m$) is used, a magnifying optical system is not applicable, and the amount of light and scan width necessary for scan-exposure cannot be ensured when a scanning optical system is assembled. Conversely, it is difficult to produce an EELED having a light-emitting region of less than 0.1 $\mu m^2$ (1 $\mu m$×0.1 $\mu m$), and the amount of light necessary for scan-exposure cannot be obtained using an EELED having a light-emitting region of less than 0.1 $\mu m^2$.

As a color photosensitive material 46, a silver halide color photosensitive material provided with three photosensitive layers having peaks of spectral sensitivity in respective wavelengths of 470 nm, 530 nm and 680 nm in the visible region can be used. In this case, GaN type EELEDs emitting light having wavelengths of 470 nm and 530 nm, and an AlGaInP type EELED emitting light having a wavelength of 680 nm may be used.

Figure 2:
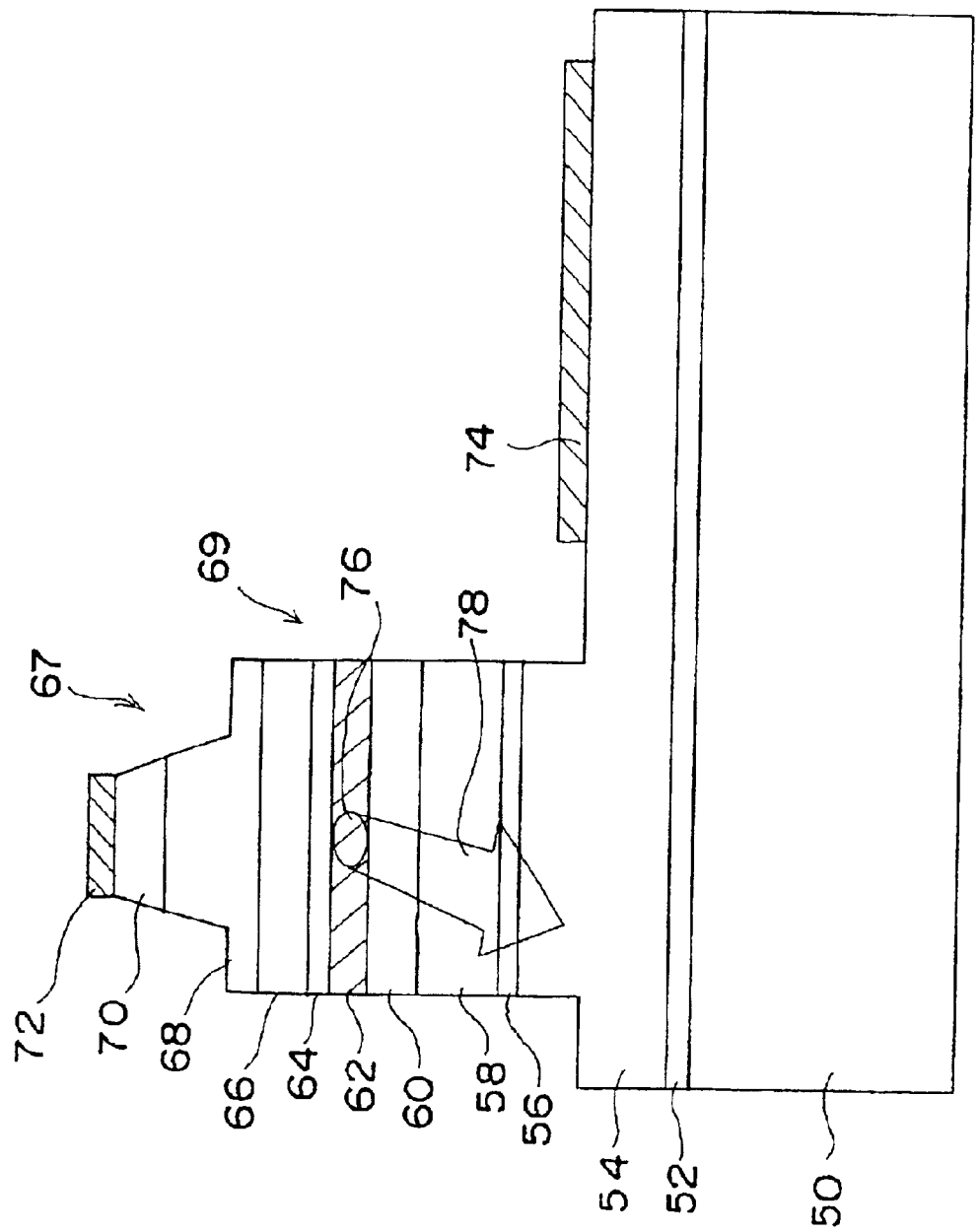
FIG. 2 is a sectional view showing an EELED.

The GaN type EELED is described in detail below. As shown in FIG. 2, this EELED can be produced by the following method, similar to a GaN type semiconductor laser having an oscillation wavelength of 410 nm.

First, using MOCVD method, a GaN buffer layer 52 is grown at a low temperature (550° C.) on a (0001) surface of a (0001) sapphire substrate 50. On this GaN buffer layer 52, an n-GaN contact layer 54, an n-InGaN anti-clacking layer 56, an n-AlGaN cladding layer 58, and an n-GaN guide layer 60 are grown in this order at a high temperature (1000° C.). Then, an InGaN multiple quantum well layer (MQW) 62 is formed on the n-GaN guide layer 60 as a light-emitting layer. By suitably changing a composition of the quantum well layer which is a light-emitting layer, a blue light beam (450 to 480 nm) or a green light beam (520 to 550 nm) can be emitted.

Then, on the InGaN multiple quantum well layer 62, a p-AlGaN cladding layer 64, a p-GaN guide layer 66, a p-AlGaN cladding layer 68 and a p-GaN contact layer 70 are grown in this order. Si is used as an n-type impurity doped into n-type layers, and Mg is used as a p-type impurity doped into p-type layers. When the crystal growth has been completed, annealing at 700° C. is carried out in a nitrogen atmosphere in order to lower resistance of the layers doped with Mg.

Then, etching is carried out until a middle portion of the p-AlGaN cladding layer 68 is reached, to form a ridge structure 67 having a ridge stripe of 2 $\mu$m width. Thereafter, etching is further carried out until the n-GaN contact layer is exposed, to form a mesa structure 69 having edge stripes of 4 $\mu$m width. Then, a p-side electrode 72 having Ni/AuTi/Al three-layer structure is formed on the p-GaN contact layer 70, and an n-side electrode 74 having Ni/AuTi/Al three-layer structure is formed on the exposed portion of the n-GaN contact layer. Finally, end surfaces are formed by cleaving and respective chips are separated, and then the end surfaces are provided with a dielectric coating for protection. Thereafter, the chip is fixed to a heat sink and wiring is carried out by wire bonding.

By driving the resulting EELED with a driving current of, for example, 20 mA, a light beam 78 is emitted from a microarea light-emitting region of, for example, 2.0 $\mu$m×2.5 $\mu$m, and a light output power of, for example, 0.2 $\mu$mW is obtained.

Although three EELEDs are used as the light source in the above-described example, an AlGaInP type semiconductor laser emitting a light beam of 680 nm may be used instead of the EELED 14a emitting red light.

Figure 3:
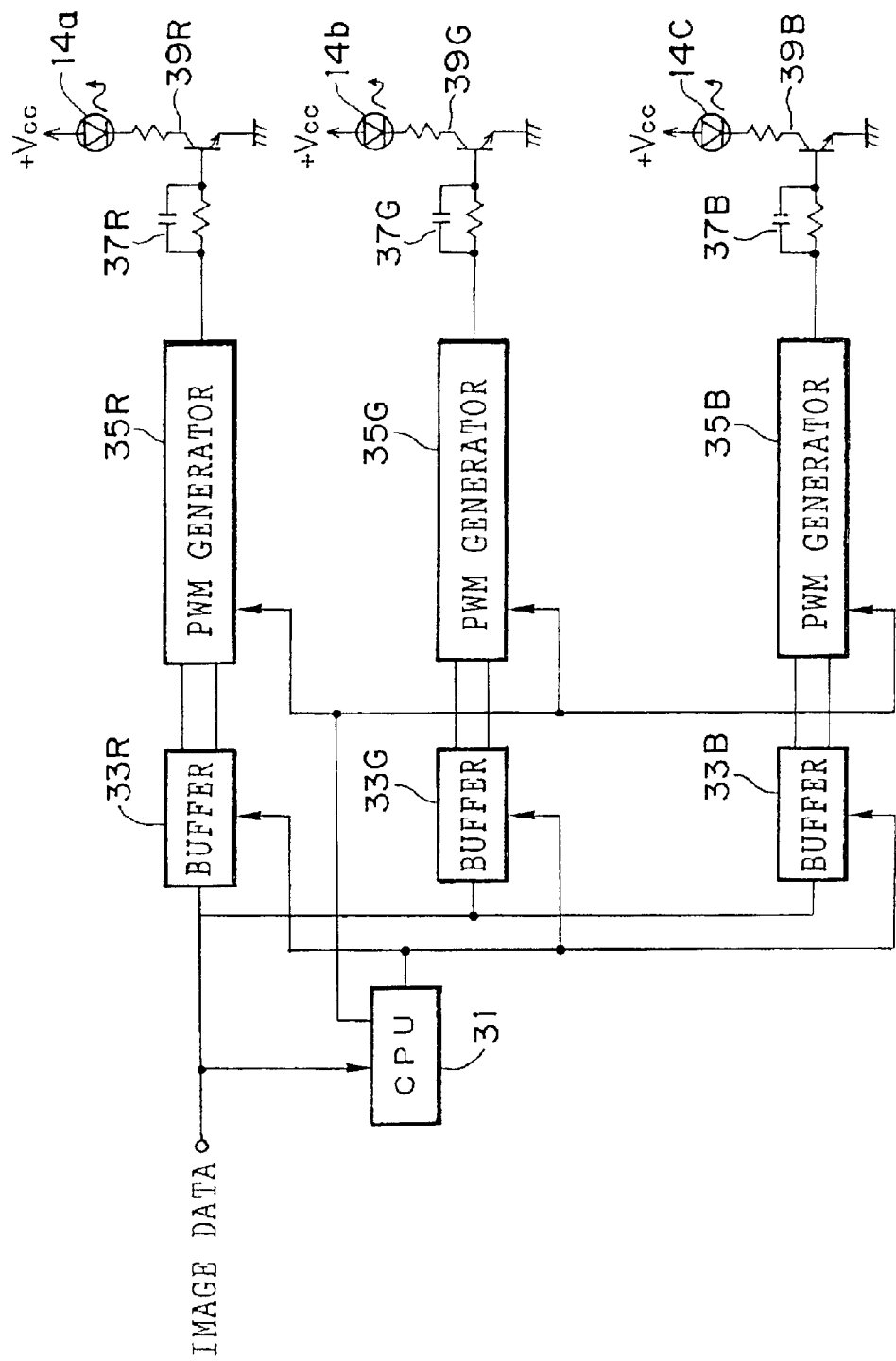
FIG. 3 is a block diagram of a modulation driving circuit of FIG. 1.

The EELEDs 14a, 14b and 14c are respectively connected to a modulation driving circuit 32. As shown in FIG. 3, the modulation driving circuit 32 is provided with a CPU 31 for controlling the entire modulation driving circuit 32, buffers 33R, 33G and 33B for temporarily storing R, G and B image data, and PWM (pulse width modulation) generators 35R, 35G and 35B whose input terminals are respectively connected to output terminals of buffers 33R, 33G and 33B.

Output terminals of the PWM generators 35R, 35G and 35B are respectively connected to bases of transistors 39R, 39G, and 39B for turning on/off the EELEDs 14a, 14b and 14c, through parallel circuits 37R, 37G and 37B formed of capacitors and resistors. Emitters of the transistors 39R, 39G and 39B are respectively grounded, and collectors thereof are respectively connected to cathodes of the EELEDs 14a, 14b and 14c through resistors. Power supply voltage Vcc is applied to respective anodes of EELEDs 14a, 14b and 14c.

The CPU 31 is connected to the respective buffers 33R, 33G and 33B, and respective PWM generators 35R, 35G and 35B, and controls output timing of image data stored in the respective buffers to the PWM generators, and output timing of EELED driving signals from the PWM generators. The EELED driving signal is a pulse signal including at least one pulse having a period shorter than a period for forming an image corresponding to one pixel. Pulses of the EELED driving signals have a constant period and a substantially constant power, and a number thereof within a period for forming an image corresponding to one pixel is determined on the basis of tone information of image data.

Figure 4:
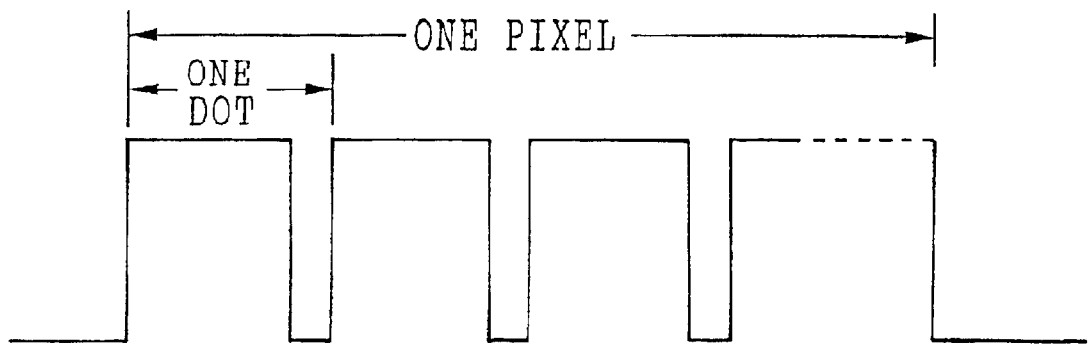
FIG. 4 is a waveform of a pulse signal in the embodiment of the present invention.
Figure 5:
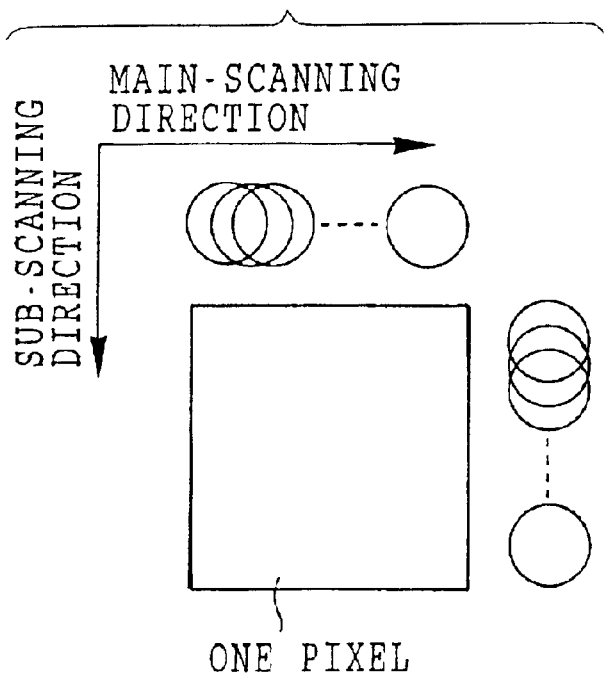
FIG. 5 is a schematic view of relationship between a pixel and dots of the embodiment of the present invention.

Next, with reference to FIGS. 4 and 5, the EELED driving signal in an exemplary case of recording at a pixel density of 400 dpi (15.7 pixels/mm) is described. As shown in FIG. 5, in the 400 dpi case, a size of one pixel is 63.5 $\mu$m×63.5 $\mu$m, and an image corresponding to the one pixel is formed by scanning for a period of 200 nano seconds in the main-scanning direction, and consists of at most eight scan lines in the sub-scanning direction. A unit light emission amount of the EELED driving signal is a light emission with a pulse having a period of 20 nano seconds (corresponding to one dot), and a pause of at least 5 nano seconds is provided between pulses. Therefore, one of nine types of EELED driving signals, which include EELED driving signals including no pulse, one pulse, two pulses, . . . or eight pulses, is generated according to tone information of image data. Thus, one pixel can be recorded with 0 to 8 dots in the main-scanning direction and 0 to 8 scan lines in the sub-scanning direction. Since the pause is provided between the pulses, the EELEDs are not continuously driven, thereby preventing generation of heat history.

When scanning is carried out with the EELED driving signals, a diameter of a dot is about 30 $\mu$m or more, and when a plurality of dots is recorded in the main-scanning direction, adjacent dots are exposed so that they are overlapped by about 80% of their diameter.

As described above, one pixel can be recorded with at most eight dots in the main-scanning direction and at most eight scan lines in the sub-scanning direction. Therefore, with 0 to 64 dots, 65-step control of an exposure amount can be enabled to render 65 different tones of density.

Although the pulse width is one eighth of the period for forming an image corresponding to one pixel in the main-scanning direction in the above-described embodiment, the pulse width is preferably one tenth or less of the period in the main-scanning direction to achieve high image quality.

Further, in a case of high-image-quality exposure, 4096-step control of an exposure amount is required. Therefore, in the present embodiment, a tone (an exposure step) of a pixel of interest is preferably determined using dither process or error diffusion process on the basis of tone image information of a plurality of neighboring pixels (for example, eight neighboring pixels).

Operation of the present embodiment is described below. When image data for respective R, G and B colors are input to the modulation driving circuit 32, pulse signals having pulses of a number corresponding to tone information of the image data are output from the PWM generator. For example, when a density of a pixel to be recorded has a maximum value, a pulse signal having eight pulses per period for forming an image corresponding to one pixel in the main-scanning direction is output. The EELEDs 14a, 14b and 14c of the light source section 10 are respectively driven on the basis of these pulse signals, and directly modulated light beams 12a, 12b and 12c are respectively emitted from the EELEDs 14a, 14b and 14c.

The directly modulated light beam 12a is collimated by the collimator lens 36a, reshaped by the beam correction optical system 38a, converged by the cylindrical lens 40a in the sub-scanning direction so as to form a line image which extends in the main-scanning direction on a reflecting surface 34a of the polygon mirror 34, and enters the polygon mirror 34. A rotation axis 34b of the polygon mirror 34 is coupled with a rotation axis of a motor (not shown), so that the polygon mirror 34 is rotated at a high speed by being driven by the motor. The light beam 12a is reflected and deflected by the polygon mirror 34 rotating at a high speed. The correction of a variation in a surface angle of the polygon mirror 34 is effected by the cylindrical lens 38 converging the light beam 12a as described above.

The deflected light beam 12a transmits through the fθ lens 42, is converged in the main-scanning direction by the lens group 44 including a cylindrical lens and the like, and made incident upon the color photosensitive material 46 to effect the main-scanning. The sub-scanning is effected by conveyance of the color photosensitive material 46 at a predetermined speed by a driving force of a driving means (not shown) in the direction of arrow Y which is perpendicular to the main-scanning direction. Thus, the color photosensitive material 46 is two-dimensionally scan-exposed. Similarly, the light beams 12b and 12c are converged in the main-scanning direction and made incident upon the color photosensitive material 46 to scan-expose the color photosensitive material 46 two-dimensionally. Thus, the color photosensitive material 46 is exposed according to the image data of the respective colors, and a color image is recorded thereon.

The silver halide color photosensitive material used in the present embodiment is provided with three photosensitive layers having peaks of spectral sensitivity in respective wavelengths of 470 nm, 530 nm and 680 nm in the visible region, and is scan-exposed with light beams respectively having wavelengths of 470 nm, 530 nm and 680 nm corresponding to the peaks of spectral sensitivity thereof.

The color photosensitive material having spectral sensitivity in the visible region is provided with a blue-sensitive photosensitive layer which is sensitized by light in a wavelength range corresponding to blue, a green-sensitive photosensitive layer which is sensitized by light in a wavelength range corresponding to green, and a red-sensitive photosensitive layer which is sensitized by light in a wavelength range corresponding to red. Spectral sensitivities of these photosensitive layers are different, i.e., the blue-sensitive photosensitive layer has the highest spectral sensitivity, the green-sensitive photosensitive layer has the next highest spectral sensitivity, and the red-sensitive photosensitive layer has the lowest spectral sensitivity among them. Therefore, to scan-expose this type of color photosensitive material, a light source from which light beams having different intensities (the highest intensity for red, the next highest intensity for green and the lowest intensity for blue) can be obtained may be used. For example, an EELED having the lowest power may be used for the blue light source, a wavelength-conversion solid laser or a second-harmonic generation laser having a higher power may be used for the green light source, and a semiconductor laser having an even higher power (e.g., a semiconductor laser having an oscillation wavelength of 680 nm) may be used for the red light source.

Alternatively, a semiconductor laser (e.g., a semiconductor laser having an oscillation wavelength of 410 nm) may be used for the blue light source, an EELED may be used for the green light source, and a semiconductor laser (e.g., a semiconductor laser having an oscillation wavelength of 680 nm) may be used for the red light source.

Figure 6:
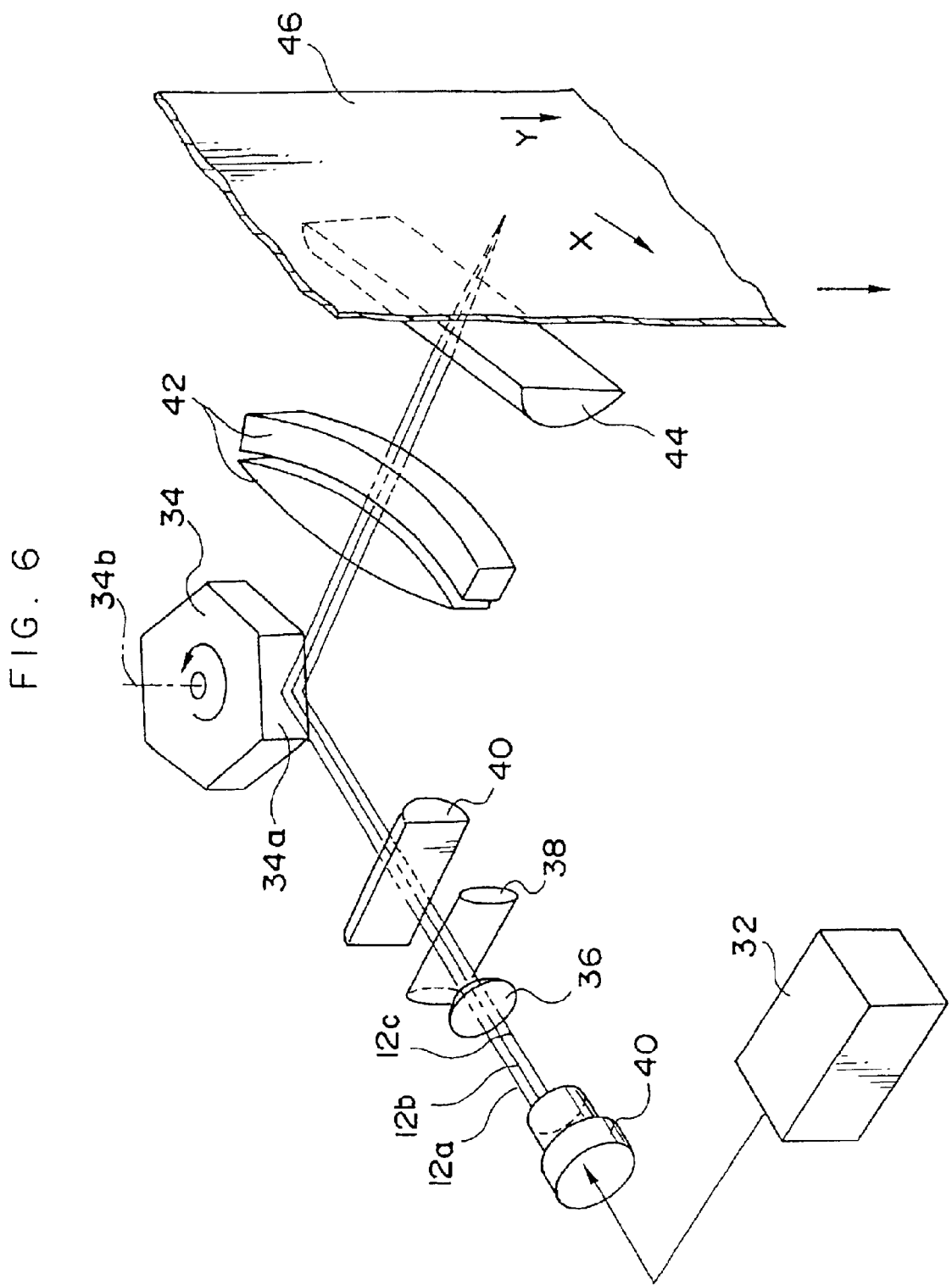
FIG. 6 is a schematic view of another embodiment of the present invention.

Next, another embodiment of the present invention is described with reference to FIG. 6. As shown in FIG. 6, a light beam scanning device of the present embodiment is similar to that described with reference to FIG. 1. Therefore, parts in FIG. 6 corresponding to those in FIG. 1 are designated by the same reference numerals, and explanation thereof is omitted.

Figure 7A:
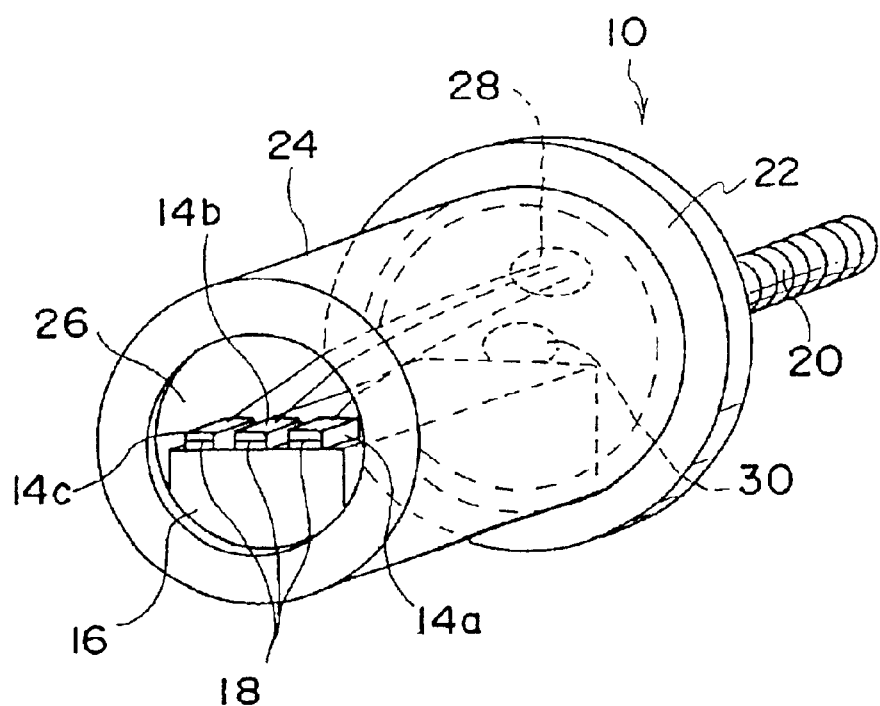
FIG. 7A is a perspective view of a light source section.
Figure 7B:
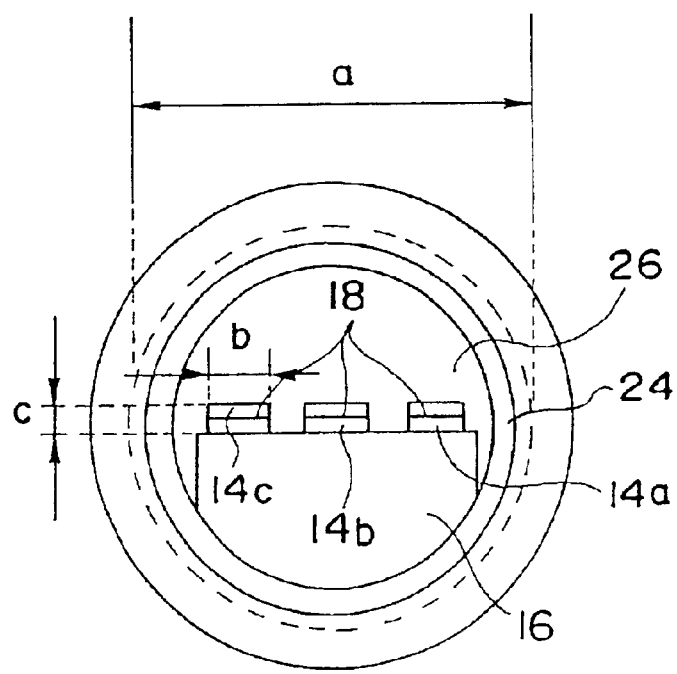
FIG. 7B is an elevational view of the light source section.

As shown in FIGS. 6, 7A and 7B, the light beam scanning device relating to the present embodiment is provided with three types of EELEDs including an EELED 14a emitting a light beam 12a, an EELED 14b emitting a light beam 12b, and an EELED 14c emitting a light beam 12c, such as described in the previous embodiment.

The EELEDs 14a, 14b and 14c are arranged side by side in a line with a predetermined spacing therebetween, at an end portion of a heat sink 16, and are fixed to the heat sink 16 with a brazing material such as indium, tin, or the like. The heat sink 16 may be made of copper having high thermal conductivity, diamond, iron, or the like.

Positioning of the EELEDs 14a, 14b and 14c can be carried out with an accuracy of ±2 μm in a direction of the optical axis and in a direction perpendicular to the optical axis using an image recognizing device or the like.

The heat sink 16 and the EELEDs 14a, 14b and 14c are mounted in an airtight space formed by jointing a casing 24 and a substrate 22 provided with a screw mount 20 for heat radiation by seal or the like. A glass window 26, through which the light beams 12a, 12b and 12c can be transmitted, is fitted in a wall surface at a light beam emitting side of the casing 24 forming the airtight space. Further, both electrodes of the EELEDs 14a, 14b and 14c are respectively wire-bonded to an anode 28 and a cathode 30 provided at the substrate 22, and are connected, through the anode 28 and the cathode 30, to a modulation driving circuit 32 provided at the outside.

In the light source section of the light beam scanning device of the present embodiment, three types of EELEDs emitting light beams having respectively different wavelengths are fixed on the single heat sink so that light beam emitting directions thereof are the same. Therefore, the three types of EELEDs can be packaged in the same casing and the light source section can be made very compact.

Since the light beam scanning device of the present embodiment is provided with the compact light source section wherein the three types of EELEDs emitting light beams having respectively different wavelengths are packaged in the same casing, a common scanning optical system can be used for these three types of EELEDs. This reduces the number of optical parts to one third, so that the scanning optical system can be made compact and the process by which the scanning optical system is assembled can be simplified. In addition, points which require optical axis adjustment and positioning are reduced, so that deterioration and displacement of the parts due to long-term usage, environment changes such as changes in temperature, humidity, and the like, vibration, impact, and the like, are less likely to be caused, and thus reliability with respect to changes in the external environment is improved. Further, as a result of the improvement of the reliability with respect to changes in the external environment, color shift at the time of image recording is highly prevented.

In the embodiments described above, the exemplary scanning optical system using the polygon mirror as the scanning means is described. However, the scanning means is not limited to scanning by reflecting light beams from a light source with a mirror. A scanning means which scans by moving a light source unit may also be used. Instead of the polygon mirror, a galvano-mirror or a micro mirror array may be used. The micro mirror array includes a number of micro mirrors whose reflection angles can be respectively adjusted, and by adjusting the reflection angles of the micro mirrors forming the array on the basis of image data, a light beam can be reflected in two-dimensional directions to perform two-dimensional scanning.

Although the example of exposing the silver halide color photosensitive material is described above, the present invention can also be used for exposing other photosensitive materials such as color photosensitive heat-sensitive materials and the like.

As described above, according to the present invention, the microarea light-emitting diodes are modulated using the pulse signal including at least one pulse having a period which is narrower than a period for forming an image corresponding to one pixel, or using the pulse signal including pulses having a constant period within a period for forming an image corresponding to one pixel and of a substantially constant power. Therefore, the pause is generated between the pulses of the signal, and light emission from the microarea light-emitting diodes is stopped during the pause. Therefore, changes in properties due to heat generation can be prevented.

What is claimed is:

1. A light beam scanning device, comprising:
   a light source provided with a microarea light-emitting diode having microarea light-emitting regions;
   a modulator for generating a pulse signal including at least one pulse having a period shorter than a period for forming an image corresponding to one pixel on the basis of image data, and modulating light beams emitted from the microarea light-emitting diode with the pulse signal; and
   a scanner for scanning a photosensitive material with the modulated light beams.

2. The scanning device according to claim 1, wherein the period of the pulse is less than one tenth of the period for forming an image corresponding to one pixel.

3. The scanning device according to claim 1, wherein an image corresponding to one pixel is formed by repeating scanning with the light beams modulated by the pulse signal in a main-scanning direction, several times in a sub-scanning direction.

4. The scanning device according to claim 1, wherein an image corresponding to one pixel is formed by being exposed several times respectively in a main-scanning direction and in a sub-scanning direction.

5. The scanning device according to claim 1, wherein a number of pulses for forming an image corresponding to one pixel is determined on the basis of tone information obtained from the image data.

6. The scanning device according to claim 1, wherein the light source includes a microarea light-emitting diode emitting a light beam in a wavelength range corresponding to blue, a microarea light-emitting diode emitting a light beam in a wavelength range corresponding to green, and a microarea light-emitting diode emitting a light beam in a wavelength range corresponding to red.

7. The scanning device according to claim 3, wherein pulse signals for producing the light beams for repeating scanning have substantially a constant level.

8. The scanning device of claim 1, wherein the light beams are formed by multiple pulse signals to form multiple overlapping dots per pixel.

9. The scanning device of claim 8, wherein a percentage overlap of dots is more than 50% of a dot diameter.

10. The scanning device of claim 1, wherein the microarea light-emitting diode is driven using a fixed current and is free of intensity modulation.

11. A scanning device, comprising:
    a light source provided with a microarea light-emitting diode having microarea light-emitting regions;
    a modulator for determining a number of pulses having a constant period and a substantially constant power within a period for forming an image corresponding to one pixel on the basis of image data, and modulating light beams emitted from the microarea light-emitting diode with a pulse signal including the pulses; and
    a scanner for scanning a photosensitive material with the modulated light beams.

12. The scanning device according to claim 11, wherein the period of the pulse is less than one tenth of the period for forming an image corresponding to one pixel.

13. The scanning device according to claim 11, wherein an image corresponding to one pixel is formed by repeating scanning with the light beams modulated by the pulse signal in a main-scanning direction, several times in a sub-scanning direction.

14. The scanning device according to claim 11, wherein an image corresponding to one pixel is formed by exposing several times respectively in a main-scanning direction and in a sub-scanning direction.

15. The scanning device according to claim 11, wherein a number of the pulses for forming an image corresponding to one pixel is determined on the basis of tone information obtained from the image data.

16. The scanning device according to claim 11, wherein the light source includes a microarea light-emitting diode emitting a light beam in a wavelength range corresponding to blue, a microarea light-emitting diode emitting a light beam in a wavelength range corresponding to green, and a microarea light-emitting diode emitting a light beam in a wavelength range corresponding to red.

* * * * *